United States Patent [19]

Tackett

[11] Patent Number: 4,987,923
[45] Date of Patent: Jan. 29, 1991

[54] SOLENOID VALVE

[75] Inventor: Wendell D. Tackett, South Bend, Ind.

[73] Assignee: Allied-Signal Inc., Morristown, N.J.

[21] Appl. No.: 370,523

[22] Filed: Jun. 22, 1989

[51] Int. Cl.[5] ............................................. F15B 13/044
[52] U.S. Cl. ........................... 137/596.17; 137/625.65; 303/119
[58] Field of Search ..................... 137/596.17, 625.65; 303/119

[56] References Cited

U.S. PATENT DOCUMENTS

| | | |
|---|---|---|
| 3,989,063 | 11/1976 | Brouwers et al. . |
| 4,350,396 | 9/1982 | Mortimer . |
| 4,668,024 | 5/1987 | Nakanishi et al. . |
| 4,679,589 | 7/1987 | Inden et al. . |
| 4,722,576 | 2/1988 | Matsuda . |
| 4,779,934 | 10/1988 | Ando . |

FOREIGN PATENT DOCUMENTS

| | | |
|---|---|---|
| 3427802 | 2/1985 | Fed. Rep. of Germany . |
| 3543882 | 6/1987 | Fed. Rep. of Germany . |

Primary Examiner—Gerald A. Michalsky
Attorney, Agent, or Firm—Larry J. Palguta; Ken C. Decker

[57] ABSTRACT

A solenoid valve (10) comprises a body (12) received within a stepped opening (13) of a modulator body (11). The solenoid valve (10) includes a first opening (16) communicating with a chamber (40) and second (20) and third (22) openings communicating with an interior area (30) of the solenoid body (12). Located within the chamber (40) is a shuttle valve (50) having a longitudinal through-opening (52) with an orifice opening (54) and a transverse opening (56) communicating with the chamber (40) and intersecting the longitudinal through-opening (52). An armature (100) is disposed within the interior area (30) and has a first valve member (101) which may seat sealingly with a valve seat (53) of the longitudinal through-opening (52) of the shuttle valve (50), and a second valve member (102) which may seat sealingly with a valve seat (28) of the third opening (22). The armature (100) has a pair of parallel axial through-passages (105). The armature (100) and shuttle valve (50) are biased by a spring (51) and each move reciprocably within the solenoid body (12). The second opening (20) extends transversely through the solenoid valve body (12) and intersects orthogonally a pair of openings (21) which communicate with the interior area (30) and are coaxially aligned with the pair of axial through-passages (105) in the armature (100).

15 Claims, 2 Drawing Sheets

SOLENOID VALVE

The present invention relates generally to a solenoid valve, and in particular to a three-way solenoid valve that may be utilized in an adaptive braking system.

Many solenoid valves have been provided previously for use in adaptive braking systems. U.S. Pat. Nos. 4,620,565 and 4,790,351 illustrate such types of solenoid valves. Solenoid valves which utilize a plunger to push a ball valve off its valve seat tend to have a reduced response time. The placement of the plunger in the decay fluid flow path necessitates that the decay passage be enlarged in order to provide for a certain amount of flow. Enlargement of the decay path increases the hydrostatic force acting on the ball due to the increased differential pressure area. Thus, this load must be overcome by the solenoid and any increase in this load results in a slower or larger solenoid valve. It is desirable to remove the plunger from the decay path. A resulting benefit of this is the subsequent reduction in parts and complexity of the solenoid valve. It is also desirable to have the armature located during adaptive braking system operation within a location where the optimum air gap is utilized so that the fastest possible response for a valve of the particular type of design is achieved. The initial movement of the armature of the solenoid valve may be necessary to open a passageway to a sump circuit so that brake fluid is decayed from the brakes, with the resulting displacement of the armature creating a larger air gap and a subsequent operation of the armature at a location in the solenoid valve that is less than the optimal range of operation due to the enlarged air gap. It is desirable to have the armature disposed, during adaptive braking system operation, within the optimal range of operation so that the air gap is minimized and the fastest response time for the valve is achieved.

The present invention solves the above problems by providing a solenoid valve, comprising a body having at one end a first opening and at a second end second and third openings, the first opening communicating with a chamber located within said body, a shuttle valve disposed movably within said chamber and having a first orifice opening communicating with a longitudinal opening in the shuttle valve and a transverse opening which intersects the longitudinal opening, first resilient means disposed between said shuttle valve and said body in order to bias said shuttle valve toward an at rest position which permits fluid to flow past said resilient means and to said transverse opening, an armature disposed within said body and located between said first and third openings, the shuttle valve and armature biased by second resilient means, the armature comprising a reciprocably movable valve member having parallel through-passages and at one end a first valve member aligned with a valve seat of said longitudinal opening of the shuttle valve and at the other end a second valve member which sealingly engages a valve seat of the third opening, the second opening in the body communicating with said parallel through-passages and an interior area of said body wherein said armature is disposed, and coil means disposed within said body and about said shuttle valve and armature, so that energization of said coil means causes said first valve to sealingly engage the valve seat of said longitudinal opening and said second valve to disengage from the valve seat of said third opening which then communicates with said second opening, and a resulting pressure differential across said shuttle valve and armature causing conjoint movement of the shuttle valve and armature toward said third opening so that fluid in said chamber flows primarily through said orifice opening.

The invention will now be described by way of example with reference to the accompanying drawings in which.

Figure 1:
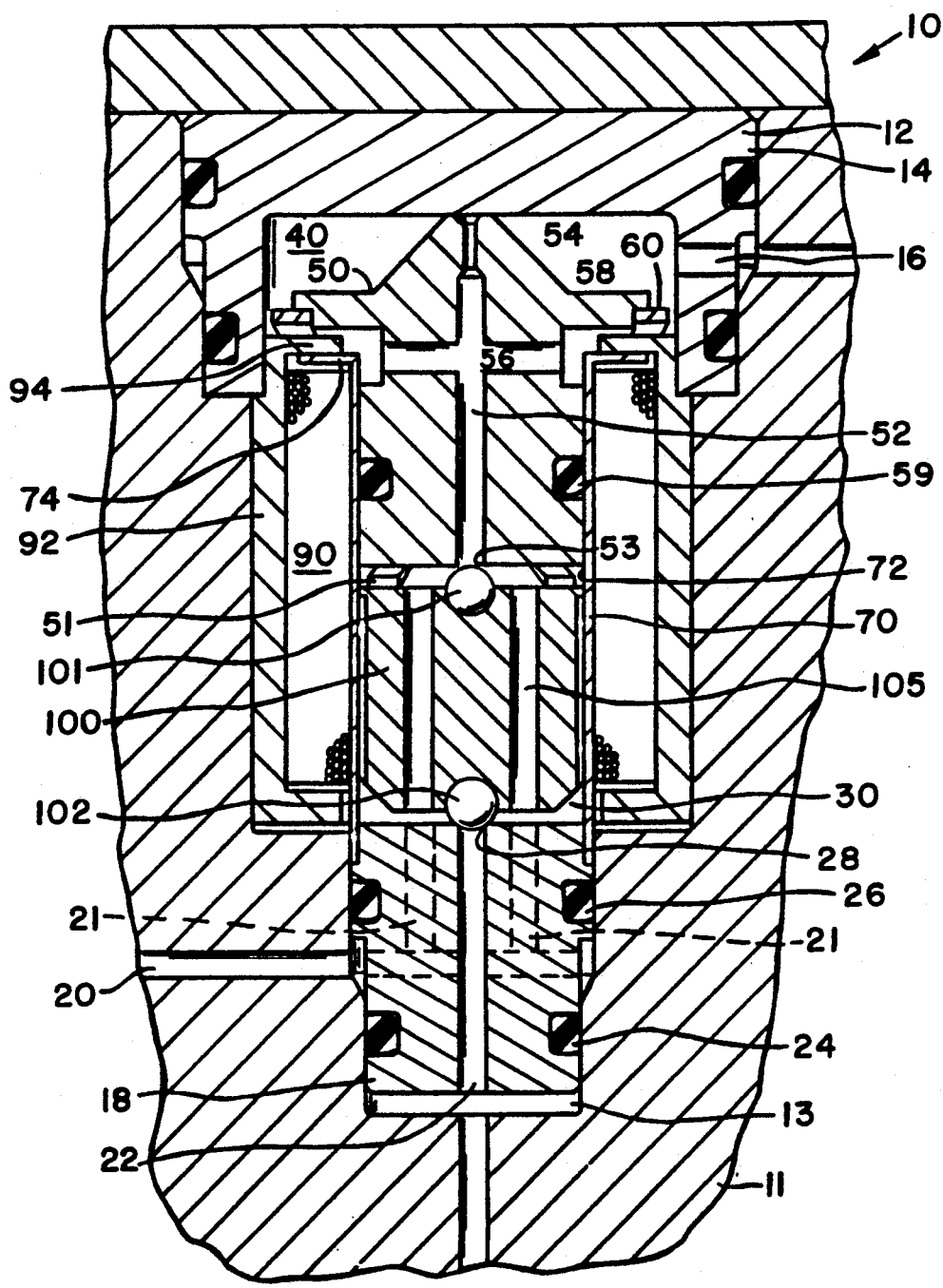
FIG. 1 illustrates the solenoid valve of the present invention during normal braking.

The solenoid valve of the present invention is indicated generally by reference numeral 10 in FIG. 1. Solenoid valve 10 comprises a valve body 12 having at body end 14 a first opening 16 which communicates with the master cylinder or pump of an adaptive braking system (not shown). It should be clearly understood that, through other valving mechanisms, both the master cylinder and pump of an adaptive braking system may communicate fluid pressure to first opening 16. The opposite body end 18 includes a second opening 20 which communicates with a brake circuit and a third opening 22 which communicates with a sump circuit of an adaptive braking system. Opposite body end 18 includes a pair of seals 24 and 26 which isolate the second and third openings from one another. Third opening 22 extends longitudinally through body end 18 to valve seat 28 which communicates with an interior area 30 of solenoid valve 10. Second opening 20 extends transversely through body end 18 without intersecting third opening 22, and communicates with a pair of perpendicularly disposed longitudinal openings 21 which communicate with the interior area 30.

Body end 14 defines a part of chamber 40 having disposed therein a shuttle valve 50. Shuttle valve 50 includes a longitudinal through-opening 52 which includes at one end an orifice opening 54 that communicates with chamber 40. Transverse opening 56 extends transversely through shuttle valve 50 and intersects longitudinal through-opening 52. Shuttle valve 50 includes a radially extending flange 58 which provides a seat for resilient means 60 located between flange 58 and a flange 94 of the body of solenoid valve 10. A cylindrical member 70 located within body 12 has an interior opening 72 which receives reciprocably shuttle valve 50. Shuttle valve seal 59 defines one end of chamber 40. Located between shuttle valve 50 and an armature 100 is a spring or resilient means 51. Longitudinal through-opening 52 includes a valve seat 53 opposite the orifice opening 54. Cylindrical member 70 has a coil 90 disposed thereabout, the coil located within an outer body member 92. Cylindrical member 70 includes a radially extending flange 74 which engages a radially extending flange 94 of outer body member 92.

Located within interior opening 30 is the armature 100 which includes at one end a first valve member 101 that can seat sealingly with valve seat 53, and at a second end a second valve member 102 which can seat sealingly with valve seat 28. A pair of parallel axial through-passages 105 extend through armature 100. Armature 100 may move reciprocably within interior opening 30. Spring 51 biases valve member 102 into sealing engagement with valve seat 28. The body 12 of solenoid valve 10 may be inserted as a unit within a stepped opening 13 of a modulator body 11.

Figure 3:
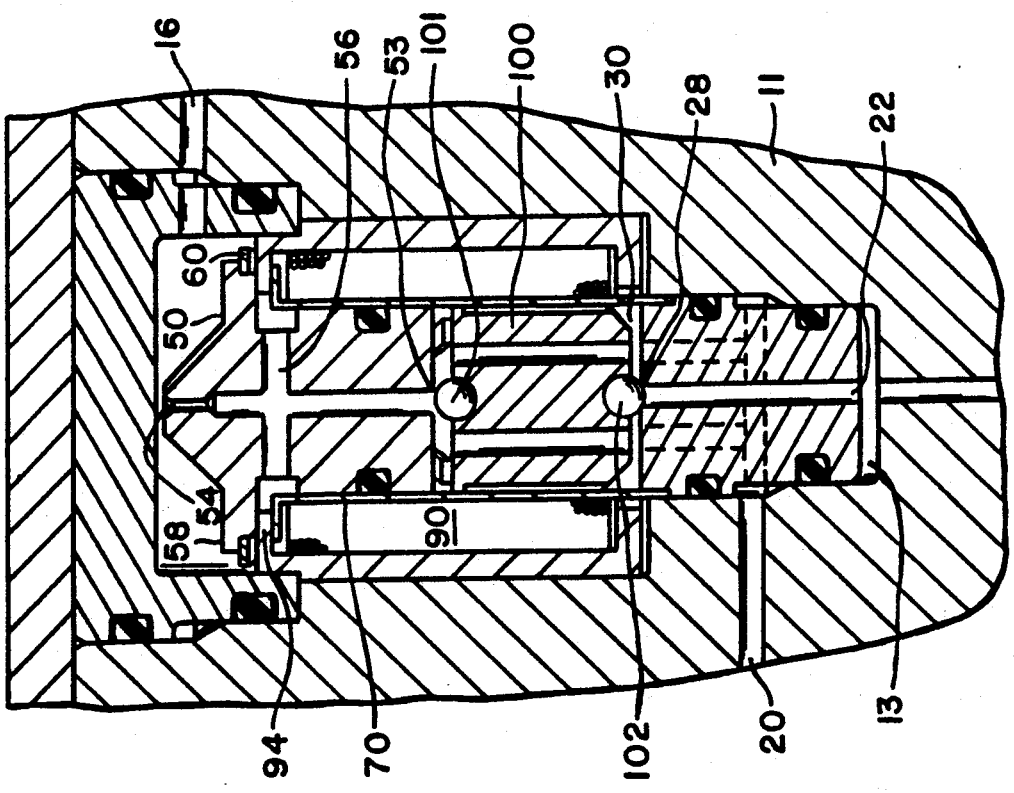
FIG. 3 illustrates the solenoid valve during subsequent stages of coil energization.
Figure 2:
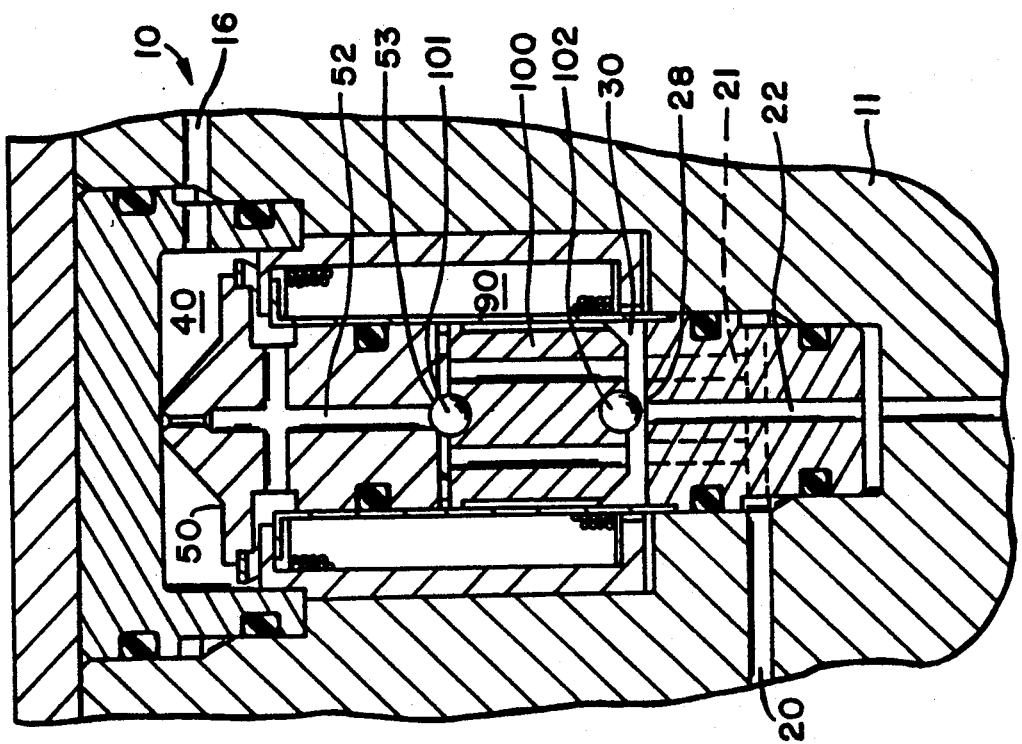
FIG. 2 illustrates the solenoid valve during an initial stage of energization of the coil.

During normal braking, fluid pressure is received from the master cylinder via first opening 16. Fluid pressure enters chamber 40 and flows around flange 58, resilient means 60, to transverse opening 56 and longitudinal through-opening 52. The fluid continues its flow past open valve seat 53 to parallel axial through-passages 105, to interior area 30, and then to openings 21 and second opening 20 which communicates with the brake circuit. The fluid travels freely from first opening 16 to second opening 20 in order to effect braking of the vehicle. During normal braking, the third opening or sump opening 22 is closed by second valve member 102. When an electronic control unit (not shown) of an adaptive braking system senses an incipient skidding condition, the electronic control unit effects energization of coil 90 which causes armature 100 to be displaced upwardly against spring 51 so that first valve member 101 engages sealingly valve seat 53 (see FIG. 2). This prevents any fluid pressure at first opening 16, be it from the master cylinder or a simultaneously energized pump, from being communicated through opening 52. Simultaneous with the closing of valve seat 53, second valve member 102 opens valve seat 28 so that brake fluid pressure at second opening 20 can decay through openings 21 to interior area 30, past valve seat 28, and through third opening 22 to the sump circuit (not shown). The reduced brake pressure present within interior area 30 in combination with the higher pressure present in chamber 40 created by the pump transmitting fluid pressure to first opening 16, causes a pressure differential across shuttle valve 50 and armature 100. This pressure differential causes the shuttle valve and armature to move conjointly downwardly so that resilient means 60 is compressed (see FIG. 3). The flange 58 of shuttle valve 50 engages flange 94 so that fluid pressure in chamber 40 is substantially restricted from communicating freely with transverse opening 56. This results in fluid pressure within chamber 40 being communicated through orifice opening 54 to the longitudinal through-opening 52. Also, the armature 100 is moved downwardly into the optimal operating range. When the shuttle valve and armature move downwardly as a result of the pressure differential, the magnetic facial area of armature 100 is displaced downwardly after initial coil activation so that armature 100 operates at an optimum air gap and this provides for the fastest possible response of the solenoid valve due to its operation within the optimal range of operation. As shuttle valve 50 moves downwardly to restrict free flow to transverse opening 56, armature 100 is moved downwardly and may then modulate between valve seats 28 and 53 to effect the build and decay functions of the adaptive braking system operation.

The present invention provides advantageously for a fast operating solenoid valve which does not require a plunger disposed within the decay path, and provides an armature disposed within the optimal range of operation during adaptive braking system operation so that a fast operational response is effected.

I claim:

1. A solenoid valve, comprising a body having at one end a first opening and at a second end second and third openings, the first opening communicating with a chamber located within said body, a shuttle valve disposed reciprocably within said chamber and having a first orifice opening communicating with a longitudinal through-opening in the shuttle valve and a transverse opening which extends transversely through the shuttle valve and intersects the longitudinal through-opening, first resilient means disposed between said shuttle valve and said body in order to bias said shuttle valve toward a normal position which permits fluid to flow past said resilient means and to said transverse opening, an armature disposed within said body and located between said first and third openings, second resilient means disposed between said shuttle valve and armature, the armature comprising a reciprocably movable valve member having a pair of parallel axial through-passages and at one end a first valve member aligned with a valve seat of said longitudinal through-opening of the shuttle valve and at the other end a second valve member which sealingly engages a valve seat of the third opening, the second opening in the body communicating with said parallel axial through-passages and an interior area of said body wherein said armature is disposed, and coil means disposed within said body and about said shuttle valve and armature, so that energization of said coil means causes said first valve to sealingly engage the valve seat of said longitudinal through-opening and said second valve to disengage from the valve seat of said third opening which then communicates with said second opening, and a resulting pressure differential across said shuttle valve and armature causing conjoint movement of the shuttle valve and armature toward said third opening so that fluid in said chamber flows through said orifice opening.

2. The solenoid valve in accordance with claim 1, wherein said shuttle valve includes sealing means disposed thereabout so that said chamber is isolated from said interior area.

3. The solenoid valve in accordance with claim 2, wherein said second opening is disposed orthogonally relative to said third opening.

4. The solenoid valve in accordance with claim 3, wherein said second opening includes perpendicular portions which extend parallel to said third opening and which are in approximate coaxial alignment with said parallel axial through-passages.

5. The solenoid valve in accordance with claim 1, wherein said shuttle valve includes a laterally extending flange which provides a seat for said first resilient means, displacement of said shuttle valve by the pressure differential causing the first resilient means to be compressed and fluid flow past said first resilient means substantially restricted by said flange.

6. The solenoid valve in accordance with claim 5, wherein said solenoid valve is inserted as an unit within a, stepped opening in a modulator body.

7. The solenoid valve in accordance with claim 6, wherein a second end of the body includes a pair of seals thereabout so that said second opening is isolated from said third opening.

8. The solenoid valve in accordance with claim 1, wherein the solenoid valve includes a generally cylindrical member receiving therein said shuttle valve and armature, the cylindrical member having an end flange extending radially outwardly to engage a radially extending flange, of said body.

9. A solenoid valve, comprising a body having at one end a first opening and at a second end second and third openings, the first opening communicating with a chamber located within said body, a shuttle valve disposed movably within said chamber and having a first orifice opening communicating with a longitudinal opening in the shuttle valve and a transverse opening which intersects the longitudinal opening, first resilient means disposed between said shuttle valve and said body in order to bias said shuttle valve toward an at rest position which permits fluid to flow past said first resilient means and to said transverse opening, an armature disposed within said body and located between said first and third openings, the shuttle valve and armature biased by second resilient means, the armature comprising a reciprocably movable valve member having parallel through-passages and at one end a first valve member aligned with a valve seat of said longitudinal opening of the shuttle valve and at the other end a second valve member which sealingly engages a valve seat of the third opening, the second opening in the body communicating with said parallel through-passages and an interior area of said body wherein said armature is disposed, and coil means disposed within said body and about said shuttle valve and armature, so that energization of said coil means causes said first valve to sealingly engage the valve seat of said longitudinal opening and said second valve to disengage from the valve seat of said third opening which then communicates with said second opening, and a resulting pressure differential across said shuttle valve and armature causing conjoint movement of the shuttle valve and armature toward said third opening so that fluid in said chamber flows primarily through said orifice opening.

10. The solenoid valve in accordance with claim 9 wherein said second opening is disposed orthogonally relative to said third opening.

11. The solenoid valve in accordance with claim 9, wherein said shuttle valve includes a laterally extending flange which provides a seat for said first resilient means, displacement of said shuttle valve by the pressure differential causing the first resilient means to be compressed and fluid flow past said first resilient means substantially restricted by said flange.

12. The solenoid valve in accordance with claim 11, wherein the solenoid valve includes a generally cylindrical member receiving therein said shuttle valve and armature, the cylindrical member having an end flange extending radially outwardly to engage a radially extending flange of said body, the flange of the body engaged by the flange of the shuttle valve to restrict fluid flow when the first resilient means is compressed.

13. The solenoid valve in accordance with claim 9, wherein said second opening includes perpendicular portions which extend parallel to said third opening and which are in approximate coaxial alignment with said parallel through-passages.

14. The solenoid valve in accordance with claim 13, wherein a second end of the body includes a pair of seals thereabout so that said second opening is isolated from said third opening.

15. The solenoid valve in accordance with claim 9, wherein said solenoid valve is inserted as an unit within a stepped opening in a modulator body.

* * * * *